United States Patent
Ye et al.

(10) Patent No.: US 12,492,384 B1
(45) Date of Patent: Dec. 9, 2025

(54) PHAGE COMPOSITION AND ITS USE IN STRENGTHENING SOIL CARBON FIXATION

(71) Applicant: Institute of Soil Science, Chinese Academy of Sciences, Jiangsu (CN)

(72) Inventors: Mao Ye, Jiangsu (CN); Shuyue Liu, Jiangsu (CN); Keyu Yao, Jiangsu (CN); Mengke Li, Jiangsu (CN); Min Qian, Jiangsu (CN); Ningsha Feng, Jiangsu (CN)

(73) Assignee: INSTITUTE OF SOIL SCIENCE, CHINESE ACADEMY OF SCIENCES, Jiangsu (CN)

( * ) Notice: Subject to any disclaimer, the term of this patent is extended or adjusted under 35 U.S.C. 154(b) by 0 days.

(21) Appl. No.: 19/067,863

(22) Filed: Mar. 1, 2025

(51) Int. Cl.
 *C12N 7/00* (2006.01)
 *C09K 17/42* (2006.01)

(52) U.S. Cl.
 CPC ............... *C12N 7/00* (2013.01); *C09K 17/42* (2013.01); *C12N 2795/00031* (2013.01)

(58) Field of Classification Search
 CPC ........................... C12N 7/00; G01N 33/56983
 See application file for complete search history.

(56) References Cited

U.S. PATENT DOCUMENTS

2020/0063109 A1    2/2020   Ye et al.

FOREIGN PATENT DOCUMENTS

| CN | 109234240 A | 1/2019 |
|---|---|---|
| CN | 109706125 A | 5/2019 |
| CN | 117602979 A | 2/2024 |
| JP | 2004097032 A | 4/2004 |

OTHER PUBLICATIONS

Todd A et al. Nature Education , 2012, p. 1-12.*
Hoorman et al. Role of Soil Bacteria , 2016, pp. 1-11.*
Ampong et al. Front. Agron. Sec. Plant-Scil Interactions, 2022, vol. 3, pp. 1-14.*
Cao e al. PLoS One, vol. 11, No. 6, 2016 pp. 1-17.*
Hunt et al. The Basic of Biochar: A Nature Soil Amendment , 2010, pp. 1-6.*

* cited by examiner

*Primary Examiner* — Bao Q Li
(74) *Attorney, Agent, or Firm* — SALIWANCHIK, LLOYD & EISENSCHENK

(57) ABSTRACT

A phage composition and an use thereof in strengthening soil carbon fixation, said phage composition including three phages, namely, a polyvalent phage φYSZKP that attacks *Klebsiella pneumoniae* and *Pseudomonas aeruginosa*; a *Bacillus cereus* phage φYSZBA1; and a *Bacillus cereus* phage φYSZBA2. In the present invention, the phage composition is injected into the target soil, and an approach of strengthening soil carbon fixation by means of cooperation with the host bacteria through injection of AMGs from the phage is employed; at the same time, the phage has a function of regulating the soil microbial communities from bottom to top; a network of symbiosis with indigenous bacteria is further optimized, and the soil carbon fixation potential is improved. This technique is an environmental improvement technique that achieves a good carbon fixation effect, has a low price and is environment-friendly.

3 Claims, 13 Drawing Sheets

PHAGE COMPOSITION AND ITS USE IN STRENGTHENING SOIL CARBON FIXATION

CROSS REFERENCE TO RELATED APPLICATION

This application claims priority to Chinese Patent Application No. 202410971919.9, filed Jul. 18, 2024; which is hereby incorporated by reference in its entirety.

TECHNICAL FIELD

The present invention belongs to the technical field of phages, and particularly relates to a phage composition and its use in strengthening soil carbon fixation.

BACKGROUND ART

With the aggravation of the global climate change, reducing carbon emissions while strengthening carbon sink and carbon fixation has become a common goal of the entire society. Presently, it is well-recognized that soil is the most important carbon pool in the global terrestrial carbon cycling. However, soil disturbances caused by human activities, such as forest destruction, ore mining and improper farming mode, etc., are a main driving factor of historical carbon loss in soil. It has been reported that from 1985 to 2020, the carbon loss caused by global forest change and impervious surface expansion was accelerated, and the accumulated net carbon loss was about 25.03 billion tons. It is known that microbiomes that have rich functions and are highly active in soil will have important influences on the transformation of soil organic matters and the carbon cycling. Specifically, microorganisms has a high proportion of carbon allocation in biosynthesis in micro-metabolism, and will eventually be transformed into a higher soil organic carbon reserve in macro scale. Therefore, it is necessary and urgent to develop technical inventions to optimize the structure of biological communities in soil and further strengthen soil carbon fixation.

Cross-boundary interaction among microorganism groups can promote the production and accumulation of carbon originated from microorganisms. Bacteriophages (phage for short) and host bacteria are typical examples realizing cross-boundary interaction. Phages are a sort of organisms that exclusively prey on living host bacteria, and are widely distributed in soil, air and water. It is estimated that the total quantity of phages reaches an order of magnitude of $10^{31}$. Phages can transfer auxiliary metabolic genes (AMGs) through horizontal gene transfer to compensate the expression of a variety of physiological functions of the host. At present, it is known that phages participate in soil carbon cycling in two ways: lysing the host community, which leads to the release of metabolites and thereby promotes the accumulation of environmental organic carbon; or participating in the host-mediated biogeochemical carbon cycling by means of lysogenization, assisting the host to perform the biosynthesis function, and finally realizing macroscopic carbon fixation.

Phage transplantation is an emerging biological technique that efficiently enriches the entire phage community in the habitat, then transplants the phage community into a designated target host environment and enables it to colonize and function. Soil phage transplantation is derived from a concept of faecal microbiota transplantation in the medical field to treat human diseases. The advantages of soil phage transplantation technique include: it can quantitatively differentiate and analyse the role and function of phages in soil microbiome, facilitate the transplantation of lysogenic phages with AMGs for carbon fixation into target soil, and successfully assist host bacteria to strengthen their own carbon synthesis and metabolism approach.

In relevant literature consultation and patent searches, no publication and acceptance of biotechnology for optimizing the soil microbial carbon fixation system and enhancing soil carbon fixing efficiency by means of phage transplantation is found, and an existing method closest to the present invention is as follows: preparing a microbial inoculum to promote soil carbon fixation, for example, the Chinese Patent Publication No. CN102775201A relates to preparing a highly active microbial organic fertilizer for carbon fixation, and the microbial inoculum used includes *Bacillus thuringiensis* and Nocard's *Bacillus*; in Chinese Patent Publication Nos. CN116813406A, CN117000756A, CN114916277A, CN101607838A and CN117209183A, a microbial inoculum is applied in combination with microplastics, clay minerals, iron oxide, a water-absorbing and water-retaining agent and multi-source solid waste to strengthen soil carbon fixation in physical and chemical aspects by ensuring the living space of microorganisms and improving the soil structure. The strains mentioned in the above inventions include nitrate-reducing and ferrous-oxidizing microorganisms, lactic acid bacteria, soil photosynthetic microorganisms or ammoniated *Vibrio thermophilus*, but the inventions don't involve cross-boundary interaction of microorganisms. Several patents involve designs of soil microbial carbon fixation system, in addition to microbial inoculum improvement. For example, in Chinese Patent Publication No. CN117296507A, livestock faces is treated with microorganisms, and then the treated organic fertilizer is added to the actual soil on the basis of calculation to enhance the soil carbon fixation potential. In Chinese Patent Publication No. CN117256286A, a drip irrigation system suitable for photosynthetic bacteria proliferation and soil carbon fixation is produced by adding a liquid photosynthetic bacteria compound fertilizer jetting-suction modules and so on to the drip irrigation system. All of these methods point out that microbial inoculums are an important way for soil carbon fixation at present, but don't involve applications aiming at a pathway of phage-host synergistic carbon fixation, which widely exists in soil.

The main drawback in the prior art is: most existing soil microbial carbon fixation techniques only incorporate some carbon fixing bacteria and culturable bacteria, but neglect the effect of microflora or entire microbial communities. In addition, artificially enhanced functional microflora may have the risk of secondary biological pollution due to the microflora or its metabolites in the process of promoting soil carbon fixation. Moreover, the manual preparation process is complicated and the preparation period is very long. Besides, the research and development of carbon fixation equipment generally involves the problems of high cost and insufficient universality.

The main reasons for the drawbacks are as follows: although it is well-recognized that soil can serve as an important carbon sink in the world, in recent years, the impact of human activities on soil carbon fixation has become deepened increasingly. However, researchers pay little attention to and carry out little research and development on the carbon fixation interaction system of soil microflorae. Owing to the competitive relationship between bacteria, the conventional technique of adding exogenous functional carbon fixing bacteria to soil may be easily affected by the dominant niche of indigenous microflora, resulting in a sharp decline in the effect and persistence of functional carbon fixing bacteria. In the technique of remediation by inoculating carbon fixing bacteria, the fermentation, production and proliferation of the microbial inoculum are complex and costly. Exogenous soil additives also pose a survival risk to the indigenous microflora, and it is difficult to evaluate the long-term negative ecological impact. Therefore, it is of great significance to add phages with a carbon fixing function, develop non-bacterial phage additives for soil carbon fixation, and develop a soil microbial carbon fixation technique that can improve carbon fixation efficiency while reducing ecological risks.

SUMMARY OF THE INVENTION

Technical problem to be solved: in view of the aforesaid drawbacks in the prior art, a phage composition and its use in strengthening soil carbon fixation are provided in the present invention. In the present invention, a phage composition is injected into the target soil, and an approach of strengthening soil carbon fixation by means of cooperation of the phage with the host bacteria through injection of AMGs is employed; at the same time, the phage has a function of regulating the soil microbial communities from bottom to top; a network of symbiosis with indigenous bacteria is further optimized, and the soil carbon fixation potential is improved. This technique is an environmental improvement technique that achieves a good carbon fixation effect, has a low cost and is environment-friendly.

Technical solution: a phage composition containing three kinds of phages, all of which were preserved in China Center for Type Culture Collection on Aug. 1, 2018, and were a polyvalent phage φYSZKP that attacks *Klebsiella pneumoniae* and *Pseudomonas aeruginosa*, is assigned with CCTCC NO. M 2018514, and is designated as *Klebsiella* and *Pseudomonas aeruginosa* phage φYSZKP; a *Bacillus cereus* phage φYSZBA1, which is assigned with CCTCC NO. M 2018517, and designated as *Bacillus cereus* phage φYSZBA1; and a *Bacillus cereus* phage φYSZBA2, which is assigned with CCTCC NO. M 2018518, and designated as *Bacillus cereus* phage φYSZBA2, respectively.

Preferably, a concentration ratio of the three phages in the composition is 1:1:1.

A method for preparing the aforesaid phage composition, comprising mixing three phages so that their concentrations in the composition reaches a predetermined ratio.

An use of the aforesaid phage composition in preparing products for strengthening soil carbon fixation.

The soil is soil used for planting Chinese cabbage, lettuce, carrot or *Capsicum frutescens* var.

A soil conditioner for strengthening soil carbon fixation, containing the aforesaid phage composition and other bioactive components that are beneficial to soil carbon fixation.

The bioactive components include microbial inoculum, humic acid, amino acid or biochar.

An use of the soil conditioner, characterized in that the soil conditioner is injected into target soil.

The working principle of the present invention is as follows: 1. phages are a kind of bacterial viruses that are composed of protein capsid (60%) and nucleic acids (40%) and have no complete mature cell structure. They can be categorized into lytic phages and lysogenic phages; 2. Lysogenic phages can inject their own genetic materials into bacteria and affect the metabolic process of the host bacterial community. Auxiliary metabolic genes (AMGs) are gene segments existing in phage genomes, which are usually randomly packaged and assembled into phage genomes during the synthesis of phage particles. AMGs can be expressed through the host during phage infection and play a key role, for example, in central carbon metabolism, energy metabolism and other processes; 3. Broad-spectrum phages refer to phages that have a capability of infecting two or more "species" of host bacteria having similar homology or different species of host bacteria, and are advantageous in extensively realizing the synergistic metabolic potential of the phages; 4. Phages for phage transplantation are selected on the basis of the natural environmental conditions (temperature, moisture, pH) and unnatural environmental conditions (heavy metals, pesticides, antibiotics) of in-situ soil. The phages selected for this technology are broad-spectrum lysogenic phages with a carbon fixation function. These phages can be well integrated into the microbial network in the region, so as to reduce the ecological risk as far as possible while achieving a better phage-host synergistic carbon fixation effect, and ensure the diversity and stability of local microbial ecological functions; 5. Phages have a length of about 20~200 μm, which is equivalent to hundredths or thousandths of the lengths of bacteria. Therefore, wide migration in soil can be achieved and the application cost is saved.

Beneficial effects: the present invention provides a phage composition and its use in strengthening soil carbon fixation, so as to meet the requirement for strengthening soil carbon fixation. The phage composition has the following advantages: 1. phages can promote the host carbon fixation process through AMGs injection, so as to effectively exert the soil carbon fixation potential; 2. lysogenic phages weaken the problem of interspecific competition existing in conventional carbon fixing microbial inoculum, and optimize the microbial community structure in the cross-boundary-cooperation aspect; 3. buffer preparation materials are widely available, and are convenient to store, transport, use and operate, and the cost can be effectively controlled.

Figure 1:
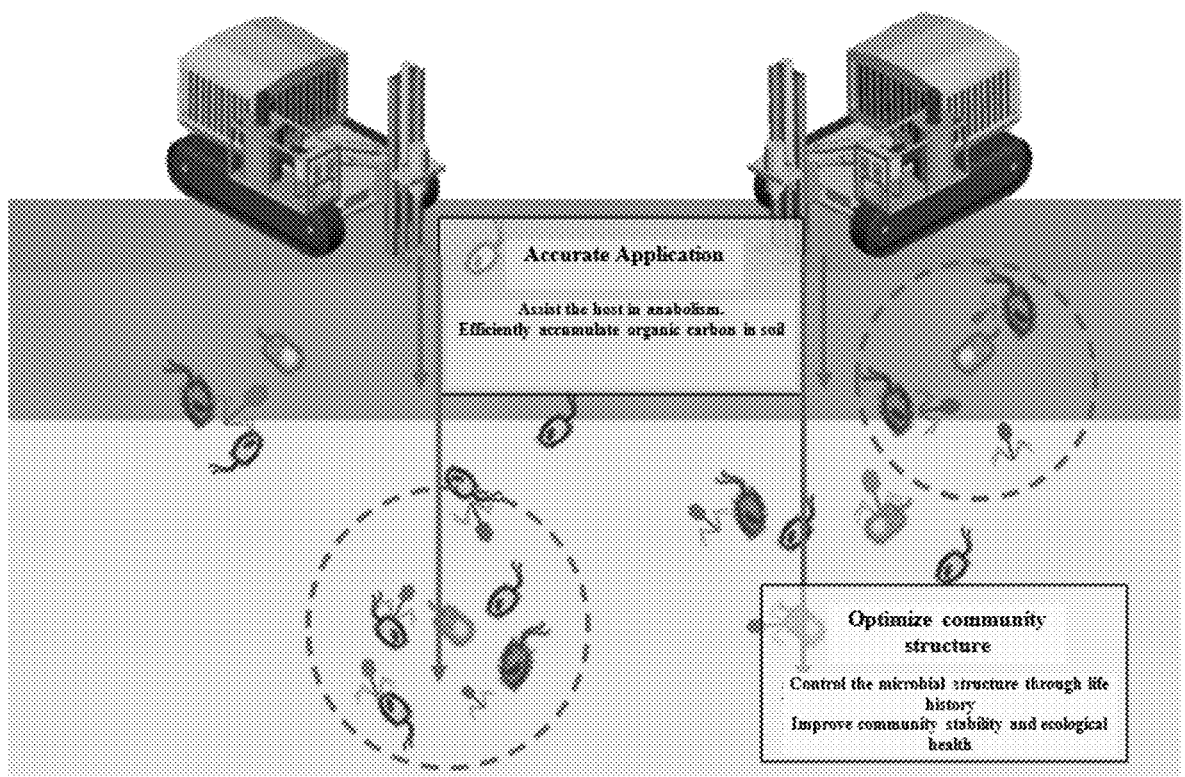
FIG. 1 is a schematic diagram of a technique used to promote promoting soil carbon fixation through phage transplantation.
Figure 2:
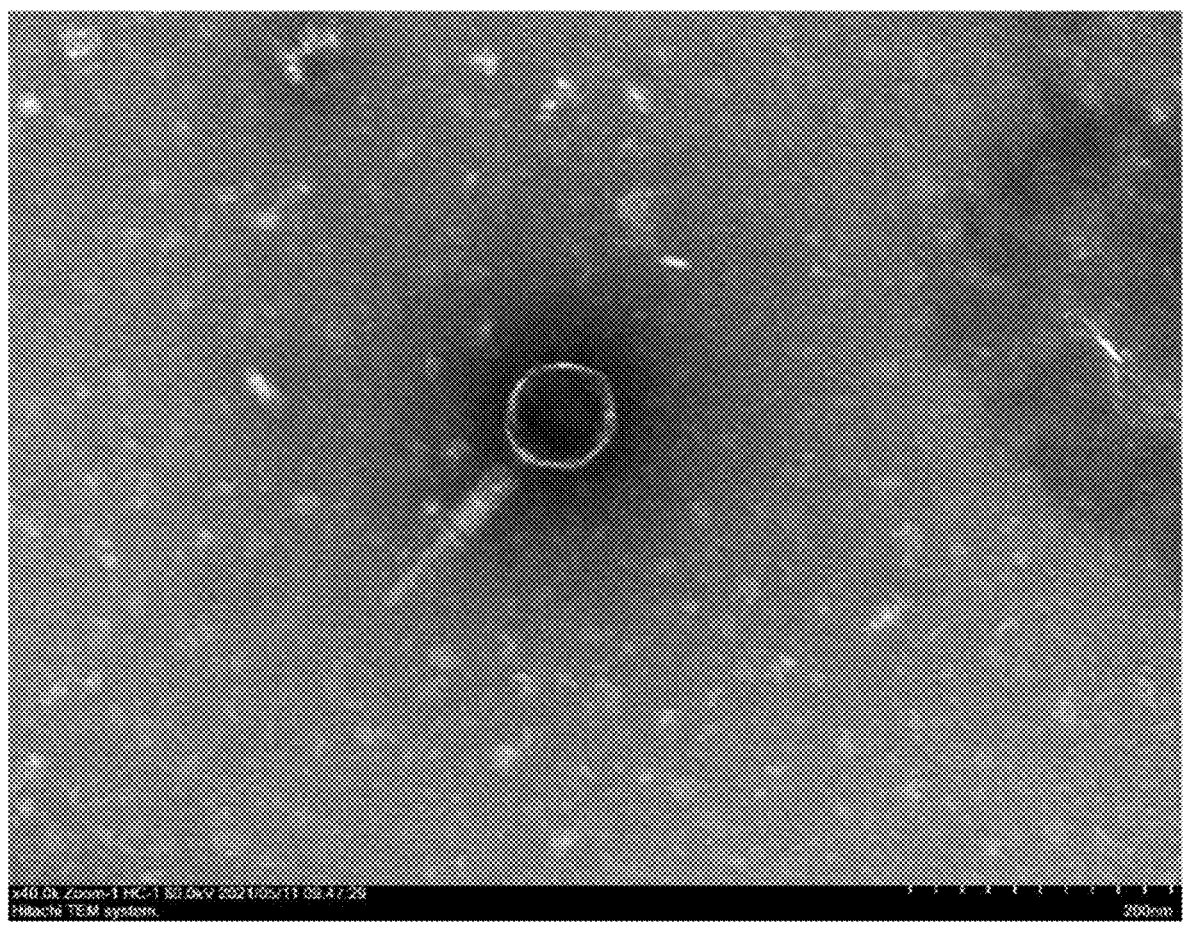
FIG. 2 is a TEM image of a phage φYSZKP.
Figure 3:
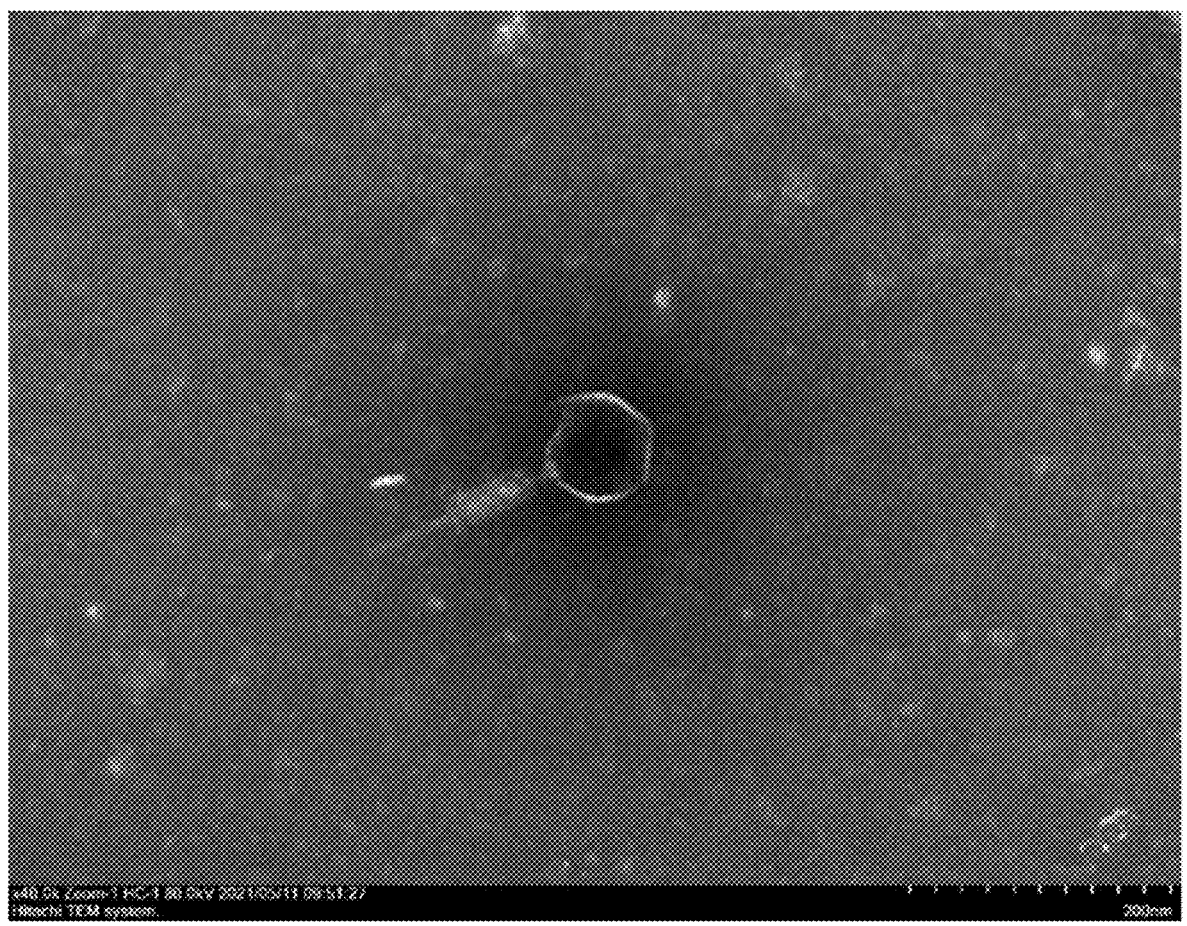
FIG. 3 is a TEM image of a phage φYSZBA1.
Figure 4:
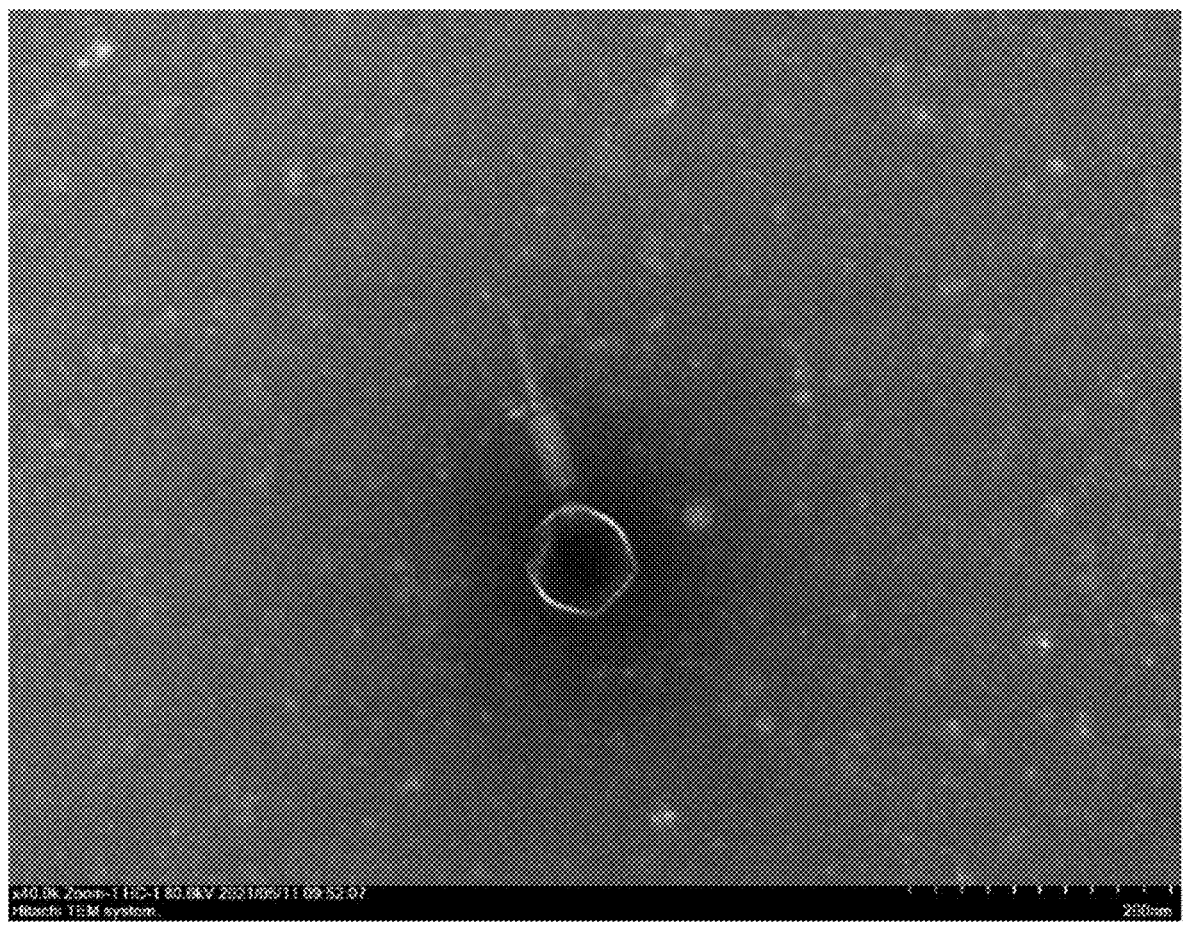
FIG. 4 is a TEM image of a phage φYSZBA2.
Figure 5:
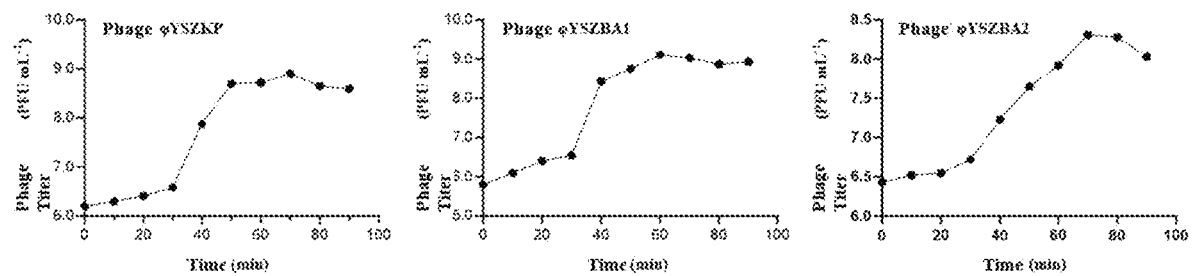
FIG. 5 shows a one-step growth curve of phages φYSZKP, φYSZBA1 and φYSZBA2)
Figure 6:
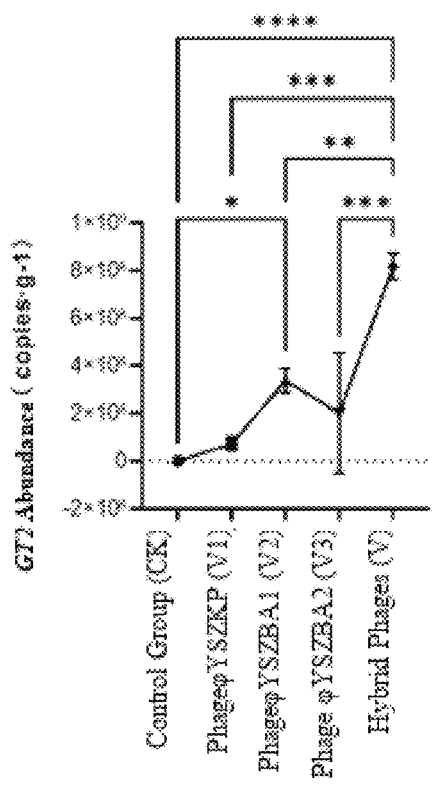
FIG. 6 shows the abundance of a related chitin synthetic gene GT2 in the soil of a vegetable base 70 days after microbial inoculum injection.
Figure 7:
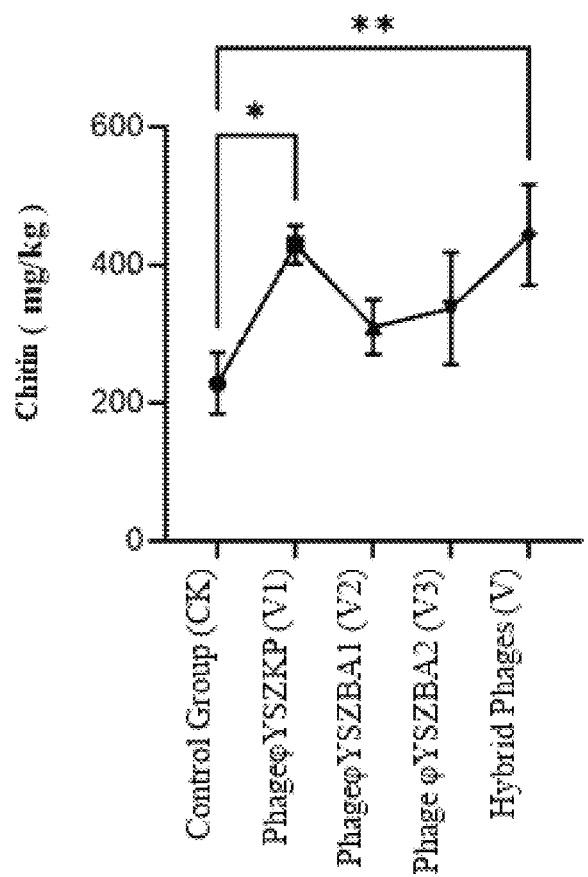
FIG. 7 shows the average content of chitin in the soil of the vegetable base 70 days after microbial inoculum injection.
Figure 8:
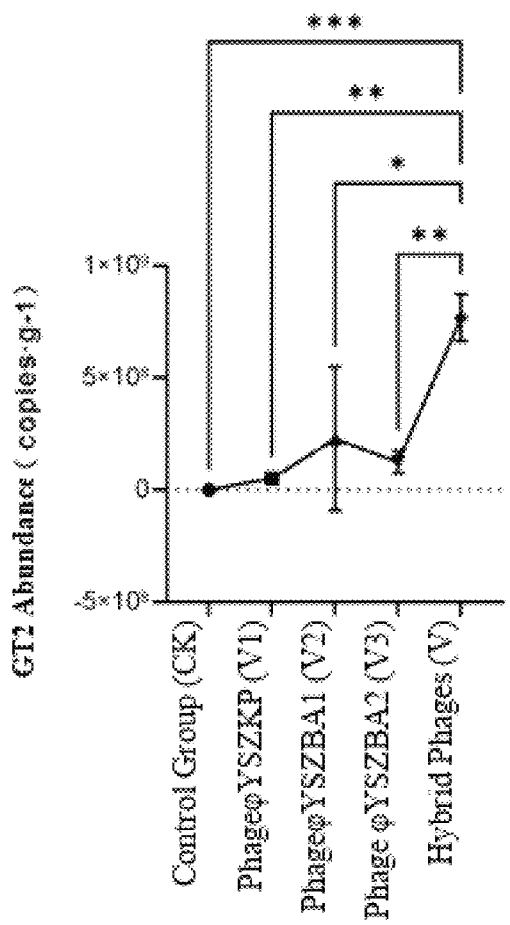
FIG. 8 shows the abundance of the chitin synthetic gene GT2 in the soil of Fengqiu Station in Henan Province 70 days after microbial inoculum injection.
Figure 9:
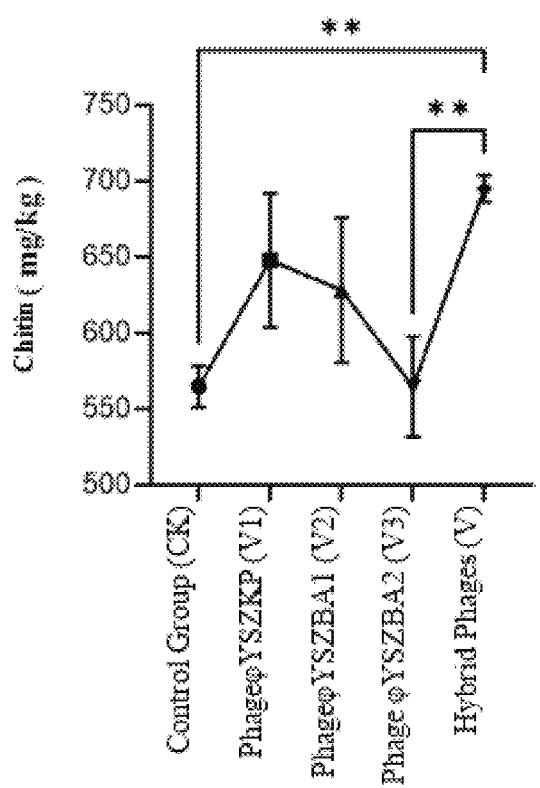
FIG. 9 shows the average content of chitin in the soil of Fengqiu Station in Henan Province 70 days after microbial inoculum injection.

The multivalent phage φYSZKP that attacks *Klebsiella pneumoniae* and *Pseudomonas aeruginosa* was preserved on Aug. 1, 2018 in China Center for Type Culture Collection, Wuhan University, No. 299 Bayi Road, Wuchang District, Wuhan City, Hubei Province, China, and assigned with a CCTCC NO. M 2018514.

The *Bacillus cereus* phage φYSZBA1 was preserved on Aug. 1, 2018 in China Center for Type Culture Collection, Wuhan University, No. 299 Bayi Road, Wuchang District, Wuhan City, Hubei Province, China, and assigned with a CCTCC NO. M 2018517.

The *Bacillus cereus* phage φYSZBA2 was preserved on Aug. 1, 2018 in China Center for Type Culture Collection, Wuhan University, No. 299 Bayi Road, Wuchang District, Wuhan City, Hubei Province, China, and assigned with a CCTCC NO. M 2018518.

EMBODIMENTS

The following detailed embodiments is not intended to limit the technical solution of the present invention in any way, and all technical solutions obtained through equivalent replacement or equivalent transformation should be deemed as falling within the scope of protection of the present invention.

The subject phages have been deposited under conditions that assure that access to the deposits will be available during the pendency of this patent application to one determined by the Commissioner of Patents and Trademarks to be entitled thereto under 37 CFR § 1.14 and 35 U.S.C § 122. The deposits are available as required by foreign patent laws in countries wherein counterparts of the subject application, or its progeny, are filed. However, it should be understood that the availability of a deposit does not constitute a license to practice the subject invention in derogation of patent rights granted by governmental action.

Further, the subject deposits will be stored and made available to the public in accord with the provisions of the Budapest Treaty for the Deposit of Microorganisms, i.e., they will be stored with all the care necessary to keep it viable and uncontaminated for a period of at least five years after the most recent request for the furnishing of a sample of the deposits, and in any case, for a period of at least 30 (thirty) years after the date of deposits or for the enforceable life of any patent which may issue disclosing the deposits. The depositor acknowledges the duty to replace the deposits should the depository be unable to furnish a sample when requested, due to the condition of the deposits. All restrictions on the availability to the public of the subject deposits will be irrevocably removed upon the granting of a patent disclosing them.

The resistance gene GT2 refers to a carbon fixation function gene (anabolic gene) carried by the phages detected in soil and a carbon fixation gene carried by in-situ host bacteria.

TABLE 1

| | Determination of Optimal Multiplicity of Infection (OMOI) | | | | | |
|---|---|---|---|---|---|---|
| Test Tube | Multiplicity of Infection (MOI) (PFU · CFU$^{-1}$) | Phage Count (PFU · mL$^{-1}$) | Bacterial Count (CFU · mL$^{-1}$) | Titer A (PFU · mL$^{-1}$) | Titer B (PFU · mL$^{-1}$) | Titer C (PFU · mL$^{-1}$) |
| 1 | 100:1 | $1 \times 10^9$ | $1 \times 10^7$ | $3.2 \times 10^6$ | $1.2 \times 10^8$ | $5.2 \times 10^8$ |
| 2 | 10:1 | $1 \times 10^8$ | $1 \times 10^7$ | $6.1 \times 10^6$ | $1.7 \times 10^8$ | $6.1 \times 10^8$ |
| 3 | 1:1 | $1 \times 10^7$ | $1 \times 10^7$ | $0.8 \times 10^7$ | $2.8 \times 10^7$ | $6.9 \times 10^8$ |
| 4 | 1:10 | $1 \times 10^6$ | $1 \times 10^7$ | $4.3 \times 10^7$ | $5.3 \times 10^6$ | $1.6 \times 10^9$ |
| 5 | 1:100 | $1 \times 10^5$ | $1 \times 10^7$ | $3.9 \times 10^8$ | $1.2 \times 10^6$ | $2.8 \times 10^9$ |
| 6 | 1:1000 | $1 \times 10^4$ | $1 \times 10^7$ | $4.7 \times 10^8$ | $4.9 \times 10^5$ | $5.2 \times 10^9$ |
| 7 | 1:10000 | $1 \times 10^3$ | $1 \times 10^7$ | $7.6 \times 10^7$ | $4.3 \times 10^5$ | $3.1 \times 10^9$ |

Note:
A: titer of phage φYSZKP;
B: titer of phage φYSZBA1;
C: titer of phage φYSZBA2.

Example 1

Test soil for potted plants is collected from Hengliang vegetable base in Nanjing, Jiangsu Province. The planted vegetable was Hongpin No. 1 *Capsicum frutescens* var from Qianshu Baihua Seeds Co., Ltd. The basic physical and chemical properties of the soil are as follows: sand grain: 26.8%, soil grain: 37.4%, clay grain: 31.82%, pH: 7.24, total nitrogen: 1.44 g·kg$^{-1}$, water-soluble nitrogen: 1.62 g·kg$^{-1}$, total phosphorus: 1.50 g·kg$^{-1}$, total potassium: 18.52 g·kg$^{-1}$, and CEC: 16.43 cmol·kg$^{-1}$.

0.5 g soil is weighed and loaded into a 15 mL sterile centrifuge tube. 4.5 mL liquid culture medium is added to the sample, the mixture is mixed thoroughly, incubated for 1 hour, and then centrifuged. The supernatant obtained by centrifugation is filtered through a tangential flow filtration system, the filtrate obtained after tangential flow filtration is a phage suspension, in which free phage is suspended in liquid component; frequent turn is needed during incubation. Separation of the filtered phage: 100 μL carbon fixation host bacteria (*Klebsiella*) in a logarithmic phase, 200 μL phage suspension, and 5 mL semi-solid culture medium are added, the mixture is poured into a solid LB culture medium, and is cultured at 30-37° C. in an inverted state after the mixture solidifies. Further phage purification: 100 μL diluent and 100

μL bacteria are sucked and spread on a double-layer plate and purified continuously for 3-5 times, until the plaques on the plate are in the same size. After the culture, the plaques on the Petri dish are transparent at the center, with no halo around it, and has a diameter of about 2-3 mm; the phage φYSZKP is obtained. A single clear and transparent plaque is picked for enrichment, mixed with 50% glycerol at a ratio of 1:1, and stored at −80° C. for later use.

Figure 10:
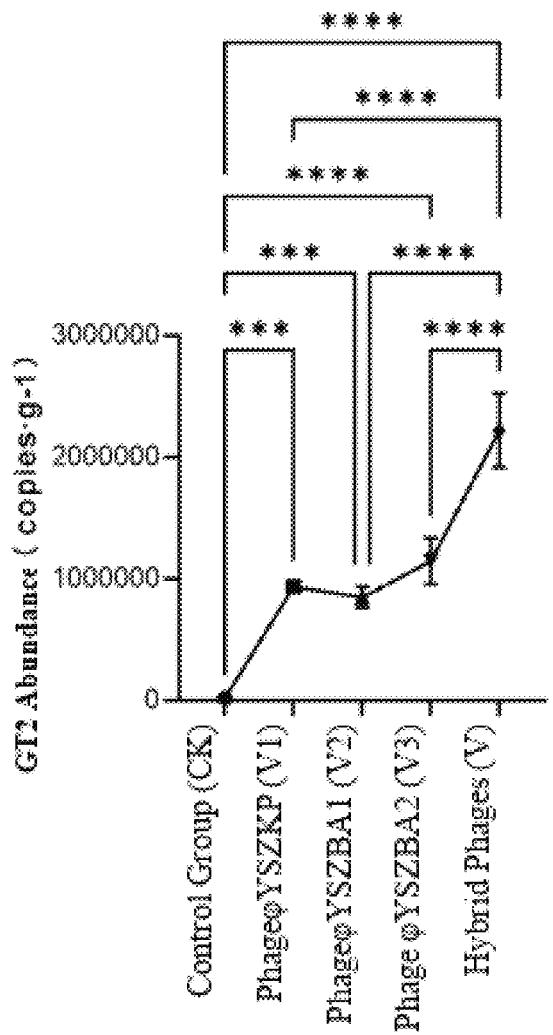
FIG. 10 shows the abundance of the chitin synthetic gene GT2 in the soil of a pesticide contaminated relocation site in Inner Mongolia 60 days after microbial inoculum injection.
Figure 11:
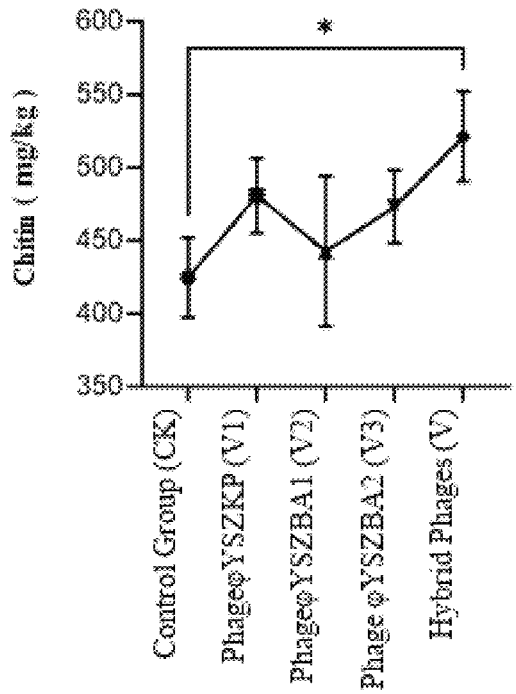
FIG. 11 shows the average content of chitin in the soil of the pesticide contaminated relocation site in Inner Mongolia 60 days after microbial inoculum injection.

Based on the aforesaid phage φYSZKP obtained from the host bacteria *Klebsiella*, a process of accelerating expression of the phage in a broad host spectrum is performed: 600 μL preserved stock solution of the phage is taken, and is added together with a mixed bacterial suspension of 200 μL *Klebsiella* and 200 mL *Bacillus cereus* into 99 mL LB liquid culture medium, then solid calcium chloride is added to adjust the final concentration to 1 mmol·L$^{-1}$; the mixture is cultured at 37° C. while shaking at 150 rpm for 96 hours, and is sampled once every 8 hours; the phage obtained by centrifugal filtration and *Bacillus cereus* are poured on a double-layer plate for verification by observing the plaques; appearance of plaques proves that the directed evolution is successful. Thus, phages φYSZBA1 and φYSZBA2 are obtained. A single clear and transparent plaque is selected for enrichment, mixed with 50% glycerol at a ratio of 1:1, and stored at −80° C. for later use.

Based on the above operations, two specific phage strains are obtained, namely: *Klebsiella* phage φYSZKP and *Bacillus cereus* phages φYSZBA1 and φYSZBA2.

Five groups are arranged in the experiment: (1) control group (CK): three plants of *capsicum frutescens* var are planted in each pot (the seeds are covered with soil having a thickness of 0.5-1 cm, at room temperature 25±2° C.); (2) single phage treatment (V1): on the basis of the control group, 100 mL suspension of phage φYSZKP at $10^6$ $pfu \cdot mL^{-1}$ concentration is inoculated; (3) single phage treatment (V2): on the basis of the control group, 100 mL suspension of phage φYSZBA1 at $10^6$ $pfu \cdot mL^{-1}$ concentration is inoculated; (4) single phage treatment (V3): on the basis of the control group, 100 mL suspension of phage φYSZBA2 at $10^6$ $pfu \cdot mL^{-1}$ concentration is inoculated; (5) hybrid phage treatment (V): on the basis of the control group, 100 mL mixed suspension of the above three phages at $10^6$ $pfu \cdot mL^{-1}$ concentration is inoculated. Soil samples are collected in situ 70 days after the plants of *Capsicum frutescens* var are planted, and the abundances of a chitin synthetic gene GT2 in the soil under the treatments of the five groups CK, V1, V2, V3 and V are $4.08 \times 10^5$ $copies \cdot g^{-1}$, $7.24 \times 10^7$ $copies \cdot g^{-1}$, $3.38 \times 10^8$ $copies \cdot g^{-1}$, $2.01 \times 10^8$ $copies \cdot g^{-1}$, and $8.19 \times 10^8$ $copies \cdot g^{-1}$ respectively (FIG. 6). Compared with the control group, the abundance of carbon fixation resistant gene GT2 in the group V is increased by three orders of magnitude ($p<0.05$). For the control group and treatment groups, the average contents of chitin in the soil are 228.32 $mg \cdot kg^{-1}$, 429.66 $mg \cdot kg^{-1}$, 310.75 $mg \cdot kg^{-1}$, 337.00 $mg \cdot kg^{-1}$, and 443.67 $mg \cdot kg^{-1}$ respectively (FIG. 7). Compared with the treatment without phage transplantation, for the treatment with hybrid phage transplantation, the content of soil organic matters is increased by 5‰ g/kg to 310‰ g/kg after 70 days culture, indicating that the addition of phage suspension has a significant effect on enriching microbial carbon anabolic genes and promoting soil carbon fixation.

Example 2

Target soil: soil from Fengqiu Station in Henan Province. The basic physical and chemical properties of the soil are as follows: pH: 6.8, organic matters: 21.1 $g \cdot kg^{-1}$, total nitrogen: 4.8 $g \cdot kg^{-1}$, total phosphorus: 2.1 $g \cdot kg^{-1}$; mechanical composition of the soil: 45.1% sand grain (sandy soil), 22.8% soil grain and 32.1% clay grain.

Five groups are arranged in the experiment: (1) control group (CK): three plants of carrot are planted in each pot (the seeds are covered with soil having a thickness of 0.5-1 cm, at room temperature 25±2° C.); (2) single phage treatment (V1): on the basis of the control group, 100 mL suspension of phage φYSZKP at $10^6$ $pfu \cdot mL^{-1}$ concentration is inoculated; (3) single phage treatment (V2): on the basis of the control group, 100 mL suspension of phage φYSZBA1 at $10^6$ $pfu \cdot mL^{-1}$ concentration is inoculated; (4) single phage treatment (V3): on the basis of the control group, 100 mL suspension of phage φYSZBA2 at $10^6$ $pfu \cdot mL^{-1}$ concentration is inoculated; (5) hybrid phage treatment (V): on the basis of the control group, 100 mL mixed suspension of the above three phages at $10^6$ $pfu \cdot mL^{-1}$ concentration is inoculated. Soil samples are collected in situ 70 days after the plants of carrot are planted, and the abundances of the chitin synthetic gene GT2 in the soil under the treatments of the five groups CK, V1, V2, V3 and V are $5.27 \times 10^5$ $copies \cdot g^{-1}$, $5.23 \times 10^7$ $copies \cdot g^{-1}$, $2.28 \times 10^8$ $copies \cdot g^{-1}$, $1.25 \times 10^8$ $copies \cdot g^{-1}$, and $7.68 \times 10^8$ $copies \cdot g^{-1}$ respectively (FIG. 8). Compared with the control group, the abundance of carbon fixation resistant gene GT2 in the treatment group V is increased by three orders of magnitude ($p<0.05$). For the control group and treatment groups, the average contents of chitin in the soil are 564.75 $mg \cdot kg^{-1}$, 647.99 $mg \cdot kg^{-1}$, 628.37 $mg \cdot kg^{-1}$, 564.73 $mg \cdot kg^{-1}$, and 695.12 $mg \cdot kg^{-1}$ respectively (FIG. 9). Compared with the treatment without phage transplantation, for the treatment with hybrid phage transplantation, the content of soil organic matters is increased by 10‰ g/kg to 22‰ g/kg after 70 days culture.

The inoculation of the phage can significantly promote the carbon fixation process of the soil microbe to a certain extent, and also is helpful for maintaining and improving the diversity and stability of soil microbial ecological functions after remediation.

Example 3

Test soil for potted plants is collected from a relocation site contaminated by bactericides and pesticides in Inner Mongolia. The basic physical and chemical properties of the soil are as follows: pH: 5.5, organic matters: 22.4 $g \cdot kg^{-1}$, total nitrogen: 2.4 $g \cdot kg^{-1}$, total phosphorus: 0.6 $g \cdot kg^{-1}$, total potassium: 11.1 $g \cdot kg^{-1}$, and rapidly available potassium: 72.7 $g \cdot kg^{-1}$; mechanical composition of the soil: 52.3% sand grain (sandy soil), 20.6% soil grain and 27.1% clay grain. The average concentration of carbon-related metabolites in soil layer zero to one meter below ground is 428.2 $mg \cdot kg^{-1}$.

Five groups are arranged in the experiment: (1) control group (CK): three plants of lettuce are planted in each pot (the seeds are covered with soil having a thickness of 0.5-1 cm, at room temperature 25±2° C.); (2) single phage treatment (V1): on the basis of the control group, 100 mL suspension of phage φYSZKP at $10^6$ $pfu \cdot mL^{-1}$ concentration is inoculated; (3) single phage treatment (V2): on the basis of the control group, 100 mL suspension of phage φYSZBA1 at $10^6$ $pfu \cdot mL^{-1}$ concentration is inoculated; (4) single phage treatment (V3): on the basis of the control group, 100 mL suspension of phage φYSZBA2 at $10^6$ $pfu \cdot mL^{-1}$ concentration is inoculated; (5) hybrid phage treatment (V): on the basis of the control group, 100 mL mixed suspension of the above three phages at $10^6$ $pfu \cdot mL^{-1}$ concentration is inoculated. Soil samples are collected in situ 60 days after the plants of lettuce are planted, and the abundances of the chitin synthetic gene GT2 in the soil under the treatments of the five groups CK, V1, V2, V3 and V are $2.15\times10^4$ copies·g$^{-1}$, $9.36\times10^5$ copies·g$^{-1}$, $8.50\times10^5$ copies·g$^{-1}$, $1.15\times10^6$ copies·g$^{-1}$, and $2.22\times10^6$ copies·g$^{-1}$ respectively (FIG. 10). For the treatment group and the control group, the average contents of chitin in the soil are 424.92 mg·kg$^{-1}$, 480.91 mg·kg$^{-1}$, 442.81 mg·kg$^{-1}$, 473.30 mg·kg$^{-1}$, and 521.33 mg·kg$^{-1}$ respectively (FIG. 11). Compared with the treatment without phage transplantation, for the treatment with hybrid phage transplantation, the content of soil organic matters is increased by 8‰ g/kg to 17‰ g/kg after 60 days culture.

Example 4

Target soil: soil from a vegetable base in Zhangye, Gansu. The basic physical and chemical properties of the soil are as follows: pH: 5.8, organic matters: 25.1 g·kg$^{-1}$, total nitrogen: 6.8 g·kg$^{-1}$, total phosphorus: 2.7 g·kg$^{-1}$; mechanical composition of the soil: 39.1% sand grain (sandy soil), 22.8% soil grain and 38.1% clay grain.

Figure 12:
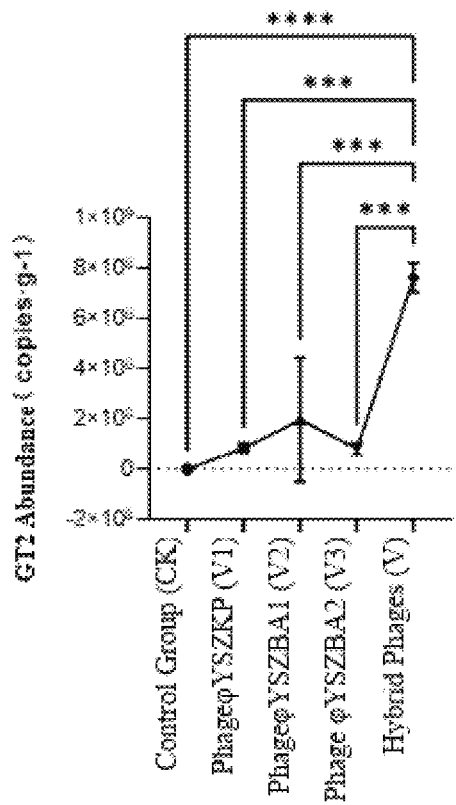
FIG. 12 shows the abundance of the chitin synthetic gene GT2 in the soil of a vegetable base in Zhangye city of Gansu Province 45 days after microbial inoculum injection.
Figure 13:
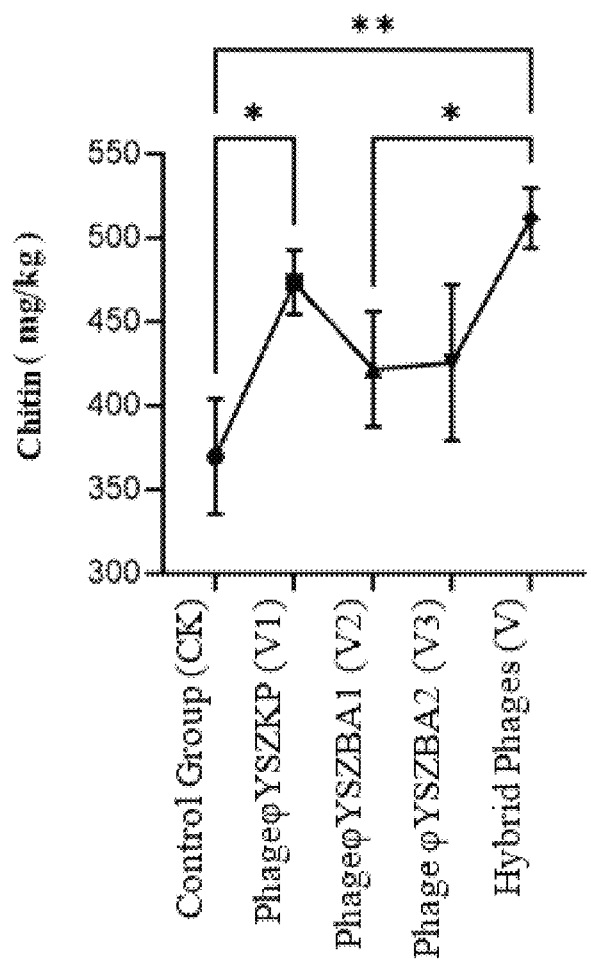
FIG. 13 shows the average content of chitin in the soil of the vegetable base in Zhangye city of Gansu Province 45 days after microbial inoculum injection.

Five groups are arranged in the experiment: (1) control group (CK): three plants of Chinese cabbage are planted in each pot (the seeds are covered with soil having a thickness of 0.5-1 cm, at room temperature 25±2° C.); (2) single phage treatment (V1): on the basis of the control group, 100 mL suspension of phage φYSZKP at $10^6$ pfu·mL$^{-1}$ concentration is inoculated; (3) single phage treatment (V2): on the basis of the control group, 100 mL suspension of phage φYSZBA1 at $10^6$ pfu·mL$^{-1}$ concentration is inoculated; (4) single phage treatment (V3): on the basis of the control group, 100 mL suspension of phage φYSZBA2 at $10^6$ pfu·mL$^{-1}$ concentration is inoculated; (5) hybrid phage treatment (V): on the basis of the control group, 100 mL mixed suspension of the above three phages at $10^6$ pfu·mL$^{-1}$ concentration is inoculated. Soil samples are collected in situ 45 days after the plants of Chinese cabbage are planted, and the abundances of the chitin synthetic gene GT2 in the soil under the treatments of the five groups CK, V1, V2, V3 and V are $2.82\times10^5$ copies·g$^{-1}$, $8.38\times10^7$ copies·g$^{-1}$, $1.96\times10^8$ copies·g$^{-1}$, $8.04\times10^7$ copies·g$^{-1}$, and $7.61\times10^8$ copies·g$^{-1}$ respectively (FIG. 12). For the treatment group and the control group, the average contents of chitin in the soil are 369.65 mg·kg$^{-1}$, 473.57 mg·kg$^{-1}$, 421.81 mg·kg$^{-1}$, 425.64 mg·kg$^{-1}$, and 511.88 mg·kg$^{-1}$ respectively (FIG. 13). Compared with the treatment without phage transplantation, for the treatment with hybrid phage transplantation, the content of soil organic matters is increased by 10‰ g/kg to 22‰ g/kg after 45 days culture.

Example 5

Target soil: soil from a polluted site of a heavy metal enterprise in Xi'an, Shaanxi. The basic physical and chemical properties of the soil are as follows: pH: 6.8, organic matters: 20.1 g·kg$^{-1}$, total nitrogen: 7.8 g·kg$^{-1}$, total phosphorus: 7.6 g·kg$^{-1}$; mechanical composition of the soil: 42.1% sand grain (sandy soil), 22.8% soil grain and 35.1% clay grain.

Figure 14:
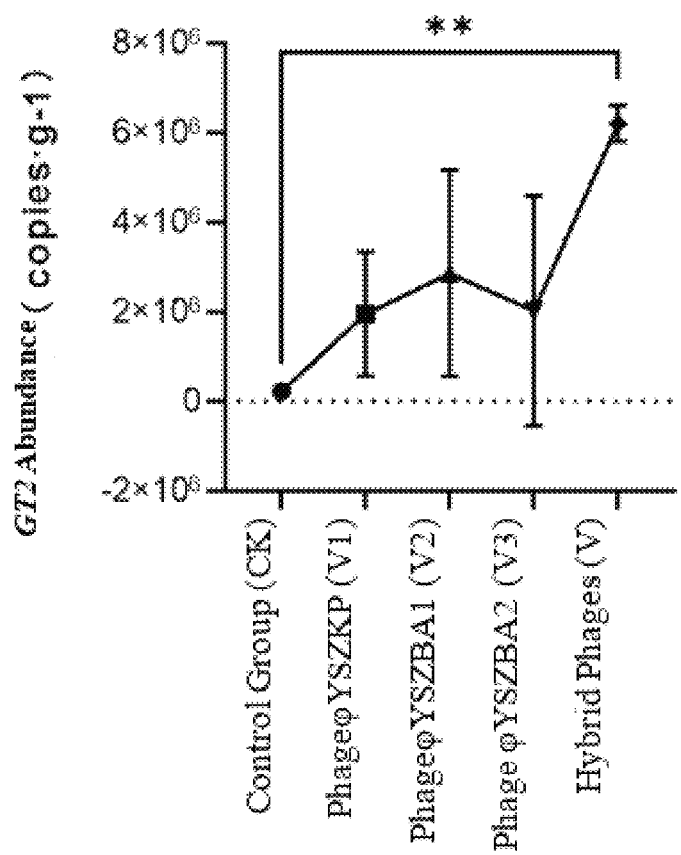
FIG. 14 shows the abundance of the chitin synthetic gene GT2 in the soil of a contaminated site of a heavy metal enterprise in Xi'an city of Shaanxi Province 70 days after microbial inoculum injection.
Figure 15:
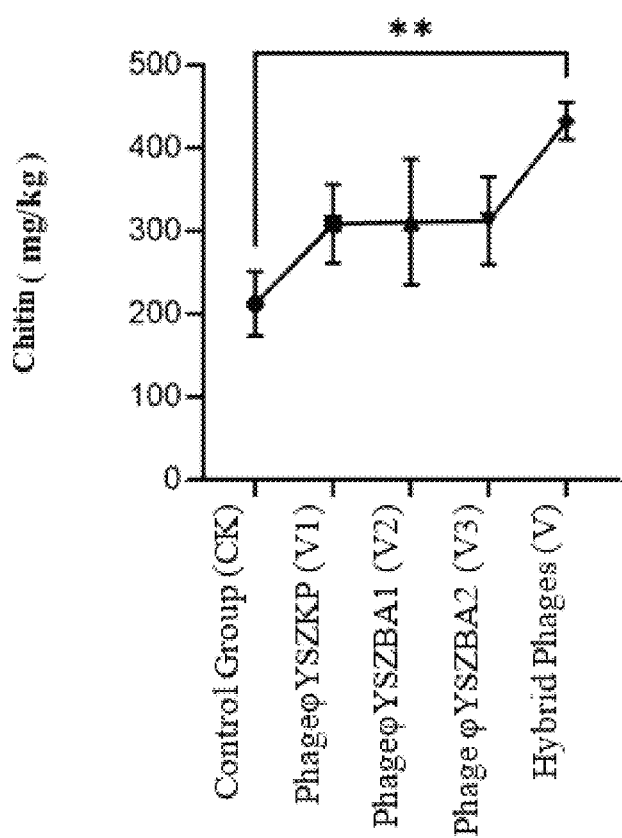
FIG. 15 shows the average content of chitin in the soil of the contaminated site of the heavy metal enterprise in Xi'an city of Shaanxi Province 70 days after microbial inoculum injection.

Five groups are arranged in the experiment: (1) control group (CK): three plants of lettuce are planted in each pot (the seeds are covered with soil having a thickness of 0.5-1 cm, at room temperature 25±2° C.); (2) single phage treatment (V1): on the basis of the control group, 100 mL suspension of phage φYSZKP at $10^6$ pfu·mL$^{-1}$ concentration is inoculated; (3) single phage treatment (V2): on the basis of the control group, 100 mL suspension of phage φYSZBA1 at $10^6$ pfu·mL$^{-1}$ concentration is inoculated; (4) single phage treatment (V3): on the basis of the control group, 100 mL suspension of phage φYSZBA2 at $10^6$ pfu·mL$^{-1}$ concentration is inoculated; (5) hybrid phage treatment (V): on the basis of the control group, 100 mL mixed suspension of the above three phages at $10^6$ pfu·mL$^{-1}$ concentration is inoculated. Soil samples are collected in situ 70 days after the plants of lettuce are planted, and the abundances of the chitin synthetic gene GT2 in the soil under the treatments of the five groups CK, V1, V2, V3 and V are $2.30\times10^5$ copies·g$^{-1}$, $1.96\times10^6$ copies·g$^{-1}$, $2.87\times10^6$ copies·g$^{-1}$, $2.03\times10^6$ copies·g$^{-1}$, and $6.21\times10^6$ copies·g$^{-1}$ respectively (FIG. 14). For the treatment groups and the control group, the average contents of chitin in the soil are 212.26 mg·kg$^{-1}$, 308.67 mg·kg$^{-1}$, 310.75 mg·kg$^{-1}$, 312.27 mg·kg$^{-1}$, and 432.78 mg·kg$^{-1}$ respectively (FIG. 15). Compared with the treatment without phage transplantation, for the treatment with hybrid phage transplantation, the content of soil organic matters is increased by 9‰ g/kg to 16‰ g/kg after 50 days culture.

The result proves that the applied technique of promoting soil carbon fixation by phage transplantation has the advantages of high broad-spectrum, low ecological risk and environmental friendliness, and it is a soil carbon storage optimization technique that has good application prospects.

We claim:

1. A method of enhancing soil carbon fixation, the method comprising applying a phage composition to the soil, wherein the phage composition comprises:
   *Klebsiella pneumoniae* and *Pseudomonas aeruginosa* phage φYSZKP, having accession number CCTCC NO. M 2018514;
   *Bacillus cereus* phage φYSZBA1, having accession number CCTCC NO. M 2018517; and
   *Bacillus cereus* phage φYSZBA2, having accession number CCTCC NO. M 2018518.

2. The method of claim 1, wherein the soil is used for planting Chinese cabbage, lettuce, carrot or *Capsicum frutescens*.

3. The method of claim 1, wherein the phage composition comprises the *Klebsiella pneumoniae* and *Pseudomonas aeruginosa* phage φYSZKP, *Bacillus cereus* phage φYSZBA1 and *Bacillus cereus* phage φYSZBA2 at a concentration ratio of 1:1:1.

* * * * *